Jan. 14, 1936. C. L. KELLER 2,027,483
METHOD OF MAKING COMPOSITE MOLDED PRODUCTS
Filed June 7, 1928
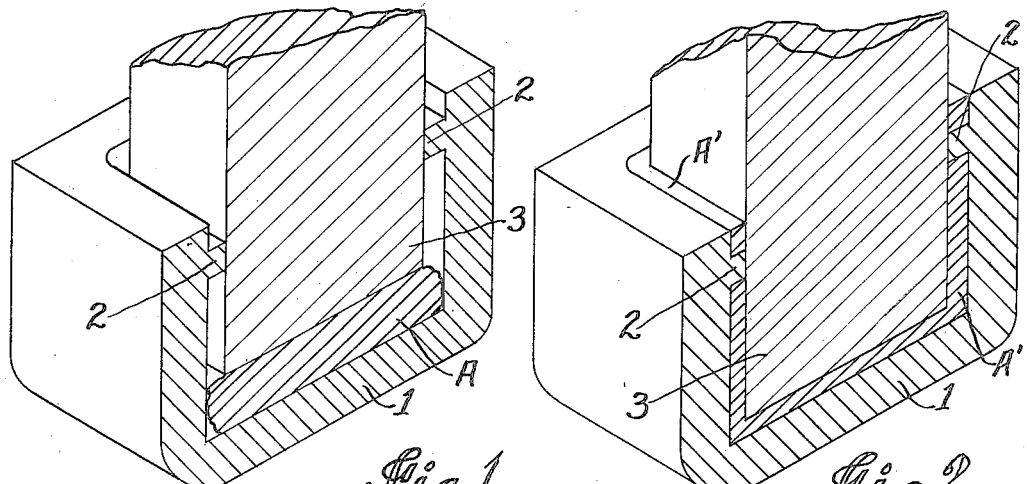
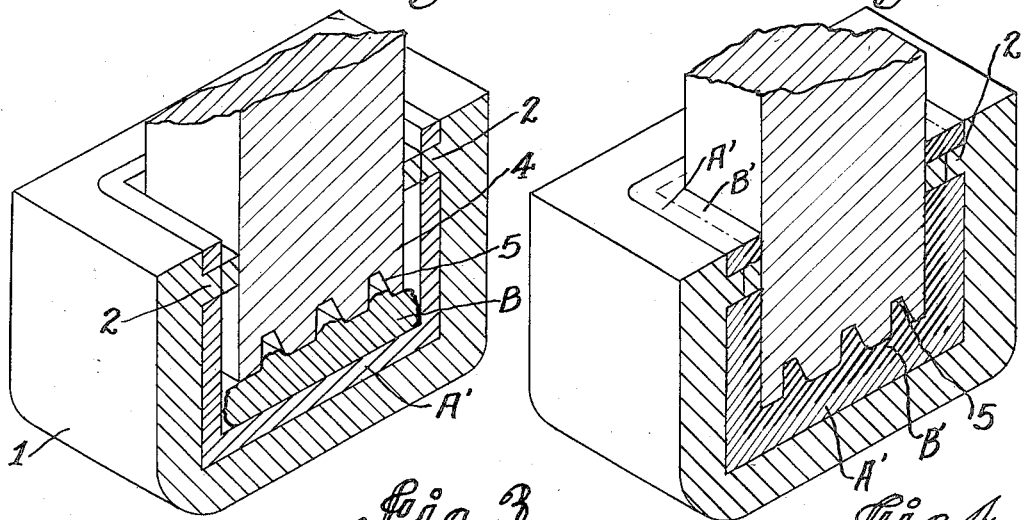
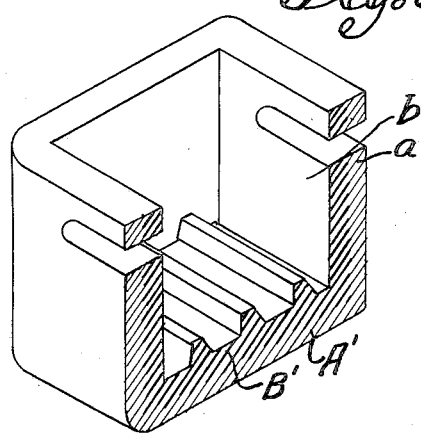
INVENTOR.
Charles L. Keller
BY Allen & Allen
ATTORNEYS.

Patented Jan. 14, 1936

2,027,483

UNITED STATES PATENT OFFICE 2,027,483

METHOD OF MAKING COMPOSITE MOLDED PRODUCTS

Charles L. Keller, Cincinnati, Ohio, assignor to The Richardson Company, Lockland, Ohio, a corporation of Ohio Application June 7, 1928, Serial No. 283,739

1 Claim. (Cl. 18—59)

My invention has to do with the production of molded products out of various compositions of binder, fiber and filler in forms for which any given formula may alone be unsuitable. In recent years there has been great progress in the manufacture, for example, of molded products from bituminous compositions which comprise a bituminous binder, a mineral filler and a fibrous ingredient such as asbestos or some vegetable fiber.

It is to be understood that the physical qualities of such bituminous compositions vary widely with different factors: (a) the kind and character of the raw material employed; the softening point, penetration and susceptibility factor of the binder; the nature of the non-fibrous filler; the character and fiber length of the fibrous ingredient, etc.; (b) the proportion of ingredients employed; the relation of the quantity of binder to the total quantity of filler substances; the amount of fiber in relation to the whole compound, etc.; (c) the mixing process employed, i. e. the manner in which particularly the fibrous ingredient is distributed throughout the body of the binder, etc.; and (d) other miscellaneous factors such as molding conditions and the like.

Wide as the variations due to these factors may be, nevertheless fibrous compositions are subject to definite limitations. It is not always possible to make one compound to meet any given specification. These limitations are as varied and difficult of definition as the factors producing variation which have been outlined above. Let it be supposed that we are working with a given compound comprised of a quantity of binder sufficient to contain the filler materials. Knowing this binder to have certain inherent physical properties, we will suppose it stiffened by the inclusion of a quantity of mineral filler and toughened and strengthened by the inclusion of a quantity of fibrous material. In order that the maximum effect may be obtained from the ingredients, we will suppose the compound to have been manufactured by bringing the bitumen while in a gummy, adhesive and extensible condition, into contact with the fibrous aggregates to be incorporated therein, and the mixing to have been done by the repeated extension of the mass to the point of individualizing the fibrous aggregate into individual fibers and distributing and interlacing these fibers homogeneously throughout the mass. This is the process described in the Patent No. 1,156,122, to James C. Woodley.

Such a compound, the ingredients, mixing and percentages being determined, will upon molding have certain measurable physical characteristics, such as a given tensile strength, a given resistance to crack and shatter, a given resistance to acid and electrolytic corrosion and the like. With bituminous compositions, the manufacturer is confronted by a paradox: the composition may be hardened and made more rigid by the use of a harder binder, but broadly speaking, as bituminous binders become harder, they become more brittle. This makes it necessary that the utmost strengthening and toughening action of the fibrous filler be utilized. A tougher composition can be made within limits by the use of greater amounts of fiber, but under these circumstances other qualities may be sacrificed as, for example, resistance to acid or easy molding qualities.

With a soft binder and a comparatively large amount of fibers, a very tough and resilient compound may be made; but this compound, by reason of the soft binder, may be subject to ready deformation under heat and slow deformation under continued stresses at even ordinary temperatures. If such a compound be made, for example, into a battery box, it may be found that while the battery box is not subject to breakage under unusual stresses, the weight of plates upon the ribs in the bottom of the cells will in a short time deform these ribs and render the box useless.

On the other hand, a compound made with an extremely hard binder, while adequate to sustain weights and resist temperature without deformation, may be so brittle as to be unusable for a given purpose. To meet definite needs, the manufacturer must, therefore, make definite compounds and mold them into articles of definite size and shape. With any given compound, the manufacturer cannot go beyond definitive limitations.

It is an object of my invention to provide means whereby these limits may be enlarged. It is an object of my invention to provide an article which will have characteristics of various types of compounds, no one of which, used alone, would be adequate for the specific use.

It is to be understood that my invention is not concerned with specific formulæ or specific types of compounds, but is applicable in its broadest aspect to molding compositions generally, irrespective of the formulæ thereof, providing they are satisfactorily handled in the molding operations to which I shall refer; and in order that my invention may be understood in a specific example, I shall hereinafter describe it with reference to a given article, namely storage battery cases of the submarine type as compared with storage battery cases of the automotive type, it being understood that my invention is not restricted thereto.

Hitherto there have been various proposals looking toward the solution of the problems confronting the manufacturer, as I have outlined. The chief occurrence of the problem has to do with the strengthening and toughening of a case which has been made hard for the sake of rigidity and has therefore of necessity been made more brittle than may be desired. It has been proposed, for example, to construct an outer container of wood, metal or the like, and mold therein a plastic composition to the desired configuration. Again, it has been proposed to combine in a molding operation a plastic dough and various reinforcements therefor. Such reinforcements may be a preformed fibrous structure impregnated with the same bitumen or other substance as forms the binder of the plastic dough. All of these expedients involve expense in handling, in material and in manufacture, and some of them have proved both uneconomical and unsatisfactory.

By my invention I combine two or more compounds selectively in an article, whereby I secure the uncommon qualities of each at those parts of the article where the qualities are of importance, thus obtaining a new article of manufacture, which, though made of old compositions, has essentially the qualities of a new composition. These qualities may be unattainable in any possible homogeneous and unitary composition.

Automotive battery boxes may be made of a composition comprising, as an example, 60% by weight of a bituminous binder, 10% of fibrous material such as cotton linters, and 30% of non-fibrous mineral filler such as infusorial earth. A composition of this character properly mixed and molded has been found entirely satisfactory for automotive storage battery cases. Such cases may for example, be in dimensions 10 inches high, 7⅜ inches wide and 9⅜ inches long, containing three integral cell cavities in the bottom of each of which is a series of upstanding ridges or projections to support the storage battery plates.

Storage battery containers for submarine use are, however, of a quite different type. The dimensions of such containers may be as much as 48 inches high, 24 inches wide and 36 inches long, or even larger, and the bituminous composition satisfactory for automotive battery cases would be quite unsatisfactory for these. In general in the larger article, it would be too brittle and too subject to breakage under shock; it may also, depending upon the quality of the bitumen, be too subject to deformation.

As an example of a different type of composition having utterly different qualities, I may take 65% of bitumen, and while maintaining it in a stiffly gummy condition to avoid as much as possible the saturation of the filler and fibrous ingredients while obtaining a coating thereof, I may incorporate 15% by weight of vegetable fiber such as cotton linters, and 20% by weight of ground cork. I may thus obtain when the compound is molded under very light pressure, a product with as low a specific gravity as 1.02, while the specific gravity of the typical composition for automotive storage battery cases described above may be as high as 1.30.

The composition which I have just described will be very tough and very resilient, not at all subject to breakage from sudden shock or jar, and possessing a satisfactory tensile strength. It will, however, be subject to deformation quite readily under a comparatively low degree of heat, and to gradual deformation under stress at comparatively low temperatures. Furthermore, it will not be entirely acid resistant, but will be subject to a slow disintegration under the influence of concentrated sulphuric acid. All of these factors render it unsatisfactory for use either in the manufacture of automotive battery cases or in the manufacture of submarine types. The automotive composition has the requisite rigidity for submarine cases but is too brittle; the second composition has the requisite toughness and tensile strength, but is subject to deformation and is not acid resistant. In order to obtain a satisfactory storage battery case, the qualities of both compositions must be combined; but this cannot be done by merely mixing the ingredients together, since this would result in a new composition having the qualities of neither.

I accomplish the objects of my invention as they have been outlined above, and as they will become apparent to one skilled in the art, upon reading these specifications, by that certain process which I shall now describe, reference being had to the accompanying drawing, in which Figure 1 is a sectional perspective view of portions of the female member and plunger of a pressure mold, with the mass of outer composition therein and initially pressed by the plunger.

Fig. 2 is a similar view showing the completion of molding the outer composition.

Fig. 3 is a similar view showing the mass of inner composition in the molded outer composition and initially pressed by a plunger.

Fig. 4 is a similar view showing the completion of molding of the inner composition within the outer composition.

Fig. 5 is a similar view of the article molded as in Fig. 4 and removed from the mold.

The illustrations of the mold and the article are conventional only, with details, such as a stripper, removable cores etc. of the mold omitted; and the article not being representative, as to detail, of the most approved designs, but being chosen for simple and clear illustration of mold configurations to be followed by the compositions under deforming pressure.

For the production of submarine cases, I prefer to take a quantity of a tough, resilient and strong fibrous composition A of the latter type (though varying its composition as may be desired for specific uses) and place this as shown in Fig. 1 in the female member 1 of a mold bearing the configuration of the outside of the desired battery case including, for instance, handle opening cores 2. I then mold this composition within the mold member by means of a plunger 3, as shown in Fig. 2, which is larger than the desired inner configuration of the case which I desire. I thus obtain a molded portion A' having the exterior configuration of a submarine case, but thinner in wall than the case which I desire. As in ordinary practice, I permit the material to become rigid in the mold and then withdraw the plunger.

Next, as shown in Fig. 3, I place within the mold a quantity of plastic material B of another type similar to the composition used in the manufacture of automotive battery cases, though differing therefrom for specific uses by a modification of the ingredients; and I mold this material within the female mold member 1 while the first molded portion A' remains therein, by means of a plunger 4 of correct size which molds the interior of the case to the desired finished configuration, including, for instance, rib configurations 5. I find that, having molded a portion of the composition as indicated by A' and having allowed it to set within the mold and become relatively cool, I can thereupon introduce the second plastic mass B and cause it to flow about the mold cavities as though the previously molded portion A' formed the inner surface of a female mold; and I can do this without destroying or substantially modifying the previously formed shape, by reason of the comparatively great softness of the second introduced plastic mass B with reference to the already hardened first material A'.

Thus I can obtain a submarine storage battery case with a hard and rigid inner wall b, Fig. 5, which is relatively brittle, and a very tough and strong outer wall a which, by itself, would not be sufficiently rigid. There is enough residual heat in the second introduced plastic mass B to cause a bond of the two materials A' and B' together, whereby, to all intents and purposes, a unitary and integral structure is formed having the qualities of a compound which does not exist by itself.

There will be a large number of adaptations of my process to various uses. For example, the large size battery containers used in train lighting equipment are capable of manufacture by my process in an inexpensive and satisfactory manner. At present these cases are made of wooden boxes with interior cells of rubber, and their construction has to be both heavy and accurate for the reason that they are assembled within a container attached to a piece of railroad rolling stock and are subject to the tremendous shock incident to rapid starting and stopping of the train.

I may by my process produce an article which is the functional equivalent of wooden cases lined with preformed rubber jars, and at a much less cost. For this purpose, I may use for the outer portion of my composite article a composition containing asphalt, filler and asbestos fibers of a non-acid resisting character, either with or without other fibers, and I may use as the interior part of my composite article such a compound as is described above as being suitable for the manufacture of automotive storage battery cases.

My invention is not confined to specific formulæ or to specifically different formulæ; it is susceptible of being practiced in various molding processes. I may thus mold an outer shell in one mold with one plunger and transfer the hardened shell to another mold of similar outside configuration but with a plunger of a different size, proceeding in the second mold to mold the interior lining. Or I may conduct the molding operation in one mold, but transfer it to different presses upon which different plungers may be aligned with it; or I may make a single plunger of changeable shape, as by means of an outer and removable sheath or the like. Various modifications of my invention may be made by those skilled in the art and practiced by different molding processes, all without departing from the spirit of my invention.

Having thus described by invention, what I claim as new and desire to secure by Letters Patent, is:—

A process of making molded articles, which comprises introducing into a mold a quantity of thermoplastic composition in heat softened condition and molding said composition therein under pressure by a long draw molding operation so as to cause said composition to flow and fill the interstices of said mold and form an article of container shape, hardening said composition and introducing into the container formed thereof a second quantity of composition of thermoplastic character in heat softened condition, and of a type to bond with said first composition under conditions of heat and pressure, molding said second composition within said container as a matrix so as to form an integral article which, after hardening of said second composition, may be removed from said mold as a unit.

CHARLES L. KELLER.